Patented Oct. 3, 1933

1,928,968

UNITED STATES PATENT OFFICE 1,928,968

PROCESS FOR MAKING AN INSECTICIDE

Howard A. Jones, Cherrydale, Va., dedicated to the Government and the People of the United States of America No Drawing. Application August 23, 1930
Serial No. 477,481

3 Claims. (Cl. 167—24)

(Granted under the act of March 3, 1883, as amended April 30, 1928; 370 O. G. 757)

This application is made under the act approved April 30, 1928, and the invention herein described, if patented, may be manufactured and used by or for the Government for governmental purposes without payment to me of any royalty thereon.

I hereby dedicate the invention herein described to the free use of the public to take effect upon the granting of a patent to me.

This invention relates to a liquid insecticide containing rotenone in the form of a colloidal dispersion and to a process for producing the same. This process comprises the formation of a solution of the rotenone in acetone, diacetone alcohol, or other water soluble solvent containing one or more keto-groups, and the addition of this solution to water in the presence of a protective colloid such as tannic acid (tannin) or any of the materials known to those skilled in the art as "tannic acids". This protective colloid may be present in the solution of rotenone, it may be dissolved in the water to which the rotenone solution is added, or portions of the protective colloid may be present in both the rotenone solution and the water.

One object of the invention is to provide a colloidal suspension of rotenone in which the rotenone is in an extremely fine state of subdivision and thus enhance the activity of the rotenone as an insecticide.

Another object of the invention is to provide a suspension of rotenone from which the rotenone will not separate when allowed to stand over an extended period of time.

Another object of the invention is to provide a suspension of rotenone in water without the use of soaps, alkali salts of sulphonated oils or other materials which are hydrolyzed by water to form an alkaline solution. Because rotenone is decomposed by aqueous solutions of alkalies, it is important that it be dispersed in a non-alkaline medium.

A further object of the invention is to provide a preparation containing rotenone which may be applied in fluid form.

One advantage of the invention is the fine degree of dispersion of the rotenone which will result in a maximum insecticidal effect.

Another advantage of the invention is the ease of preparation of both the orginal solution and the final dispersion, no expensive mixing apparatus or long-continued agitation being required.

Another advantage of the invention is the fact that the rotenone may be shipped in the form of a concentrated solution containing the protective colloid, which solution need then only be added to water and stirred gently to form the colloidal dispersion.

Another advantage of the invention is the fact that the solution of rotenone may be added to moderately hard water, in the presence of a protective colloid such as tannic acid, without causing settling or undue separation of the rotenone. In fact, by using sufficient tannic acid, the rotenone may be dispersed in water of a considerable degree of hardness and will remain in suspension for a considerable length of time.

Another advantageous feature of the invention is the freedom of the preparation from oils, sulphonated fatty oils, soaps and other materials in concentrations which would be injurious to the plants sprayed.

A wide range of water soluble solvents and protective colloids has been tested in attempting to produce satisfactory suspensions of rotenone in water. Suspensions were made by adding the solution of rotenone in the solvent to be tested to water and mixing gently. Various concentrations of the original solutions have been tested and the dilution of the final suspensions has also been varied. Attempts have been made to form suspensions using the solvent alone, and also in the presence of a protective colloid.

Such solvents as acetic acid, acetone, diacetone alcohol, ethyl alcohol, ethyl formate, ethylene chlorohydrin and pyridine have been tried. With the exception of pyridine, none of these gave satisfactory suspensions when no protective colloid was added. Acetic acid, ethyl alcohol, ethyl formate, ethylene chlorohydrin and pyridine did not give permanent dispersions in the presence of a protective material such as tannic acid. Acetone and diacetone alcohol, on the other hand, have been found to give very satisfactory results when used in the presence of the proper amount of suitable protective material.

Experiments have been made to test the efficacy of a number of protective colloids for this purpose, the protective material being dissolved or suspended in water and an acetone solution of rotenone added. Among these were gum acacia, gum karaya, gum ghatti, gelatin, starch, agar agar, saponin, tannic acid, triethanolamine oleate, ammonium alginate, potassium oleate, calcium caseinate, diatomaceous earth, bentonite and lithopone. Tannic acid was found to be the most suitable material as regards suspending or protecting power, as well as from the standpoints of solubility and cost.

Suspensions made by adding acetone or diacetone alcohol solutions of rotenone in the proper concentrations to water in the presence of tannic acid have been found to be practically permanent. Thus a suspension made according to Example I below has shown no separation after standing more than forty days. The suspension made according to Example II was an almost transparent colloidal solution indicating the rotenone to be in an extremely finely-divided condition. Satisfactory suspensions have been made: (a) by dissolving all of the protective colloid in the organic solvent used and adding this to water; (b) by dissolving all of the protective colloid in the water to which the rotenone solution was then added; (c) by dissolving portions of the protective colloid in both the organic solvent and the water and subsequently mixing. The advantage of the first method is that the primary solution need only be added to water to produce the final dispersion, without adding any further protective colloid.

Some experiments have been conducted to determine the feasibility of using hard waters in the preparation of these suspensions. It has been found that, by the addition of sufficient tannic acid, waters of a fair degree of hardness may be used. In Example III Washington city water was used with good results. In another experiment 2.5 cc. of a solution of 4 grams of rotenone and 2 grams of tannic acid in 100 cc. of acetone was added to 1000 cc. of distilled water containing in solution 1 gram of tannic acid, 0.5 gram of magnesium sulfate and 0.5 gram of calcium chloride per liter. This suspension showed some separation in 7 hours and had separated considerable finely-divided material in 24 hours, but, on shaking, the settled material redispersed readily and remained in suspension throughout another 7 hour period.

It will rarely be necessary to use concentrations stronger than 1 gram of rotenone to five or ten liters of suspension for satisfactory insecticidal action. Thus suspensions made according to Examples I, II or III give rotenone concentrations of 1 gram to 10 liters, while the suspension given by Example IV has 1 gram of rotenone to 20 liters. More concentrated suspensions have been made from both acetone and diacetone alcohol solutions with good results.

In carrying out my invention in practice I have proceeded as follows with successful results:

*Example I.*—4 grams of pure rotenone and 2 grams of tannic acid U. S. P. are dissolved in 100 cc. of acetone, a clear solution resulting. 2.5 cc. of this solution is added to 1000 cc. of distilled water and shaken gently. An opalescent colloidal solution results which shows no evidence of separation during an extended period of time.

*Example II.*—1 gram of pure rotenone is dissolved in 100 cc. of acetone. 1 cc. of this solution is added to 100 cc. of distilled water containing 1 gram of tannic acid U. S. P. in solution and shaken gently. An opalescent colloidal solution results which does not settle during an extended period of time.

*Example III.*—1 gram of pure rotenone and 1 gram of tannic acid U. S. P. are dissolved in 100 cc. of diacetone alcohol. 1 cc. of this solution is added to 100 cc. of Washington city water and shaken gently. An opalescent colloidal solution results which shows no separation during an extended period of time.

*Example IV.*—1 gram of pure rotenone and 0.5 gram of tannic acid U. S. P. are dissolved in 100 cc. of diacetone alcohol; 5 cc. of this solution is added to 1000 cc. of distilled water containing 1.5 grams of tannic acid U. S. P. in solution and shaken gently. An opalescent colloidal solution results which does not settle during an extended period of time.

In like manner other water soluble alkyl or aryl solvents containing one or more keto-groups may be used with equally successful results.

For example various alkyl compounds such as methyl ethyl ketone, diethyl ketone, methyl ethyl acetone and acetyl acetone may be used. In like manner such aryl compounds as phenyl ethyl ketone and o- or m-phenyl tolyl ketone may be employed in place of acetone or diacetone alcohol.

In place of pure rotenone, a crude rotenone, or an extract of a plant containing rotenone may be used. For example extractives from Derris elliptica, Lonchocarpus and other plants known to contain rotenone may be employed.

I claim:

1. A process of producing a liquid insecticide containing rotenone in a colloidal state of dispersion which consists in dissolving rotenone in acetone, and adding this solution to water in the presence of tannic acid with subsequent mixing.

2. A process of producing a liquid insecticide containing rotenone in a colloidal state of dispersion which consists in dissolving a plant extract containing rotenone in a compound containing at least one keto-group, and adding this solution to water in the presence of tannic acid with subsequent mixing.

3. A process of producing a liquid insecticide containing rotenone in a colloidal state of dispersion which consists in dissolving a plant extract containing rotenone in acetone, and adding this solution to water in the presence of tannic acid with subsequent mixing.

HOWARD A. JONES.